Oct. 19, 1937.  E. HUNTZINGER  2,096,496
CAMERA
Filed Nov. 30, 1936   2 Sheets-Sheet 1
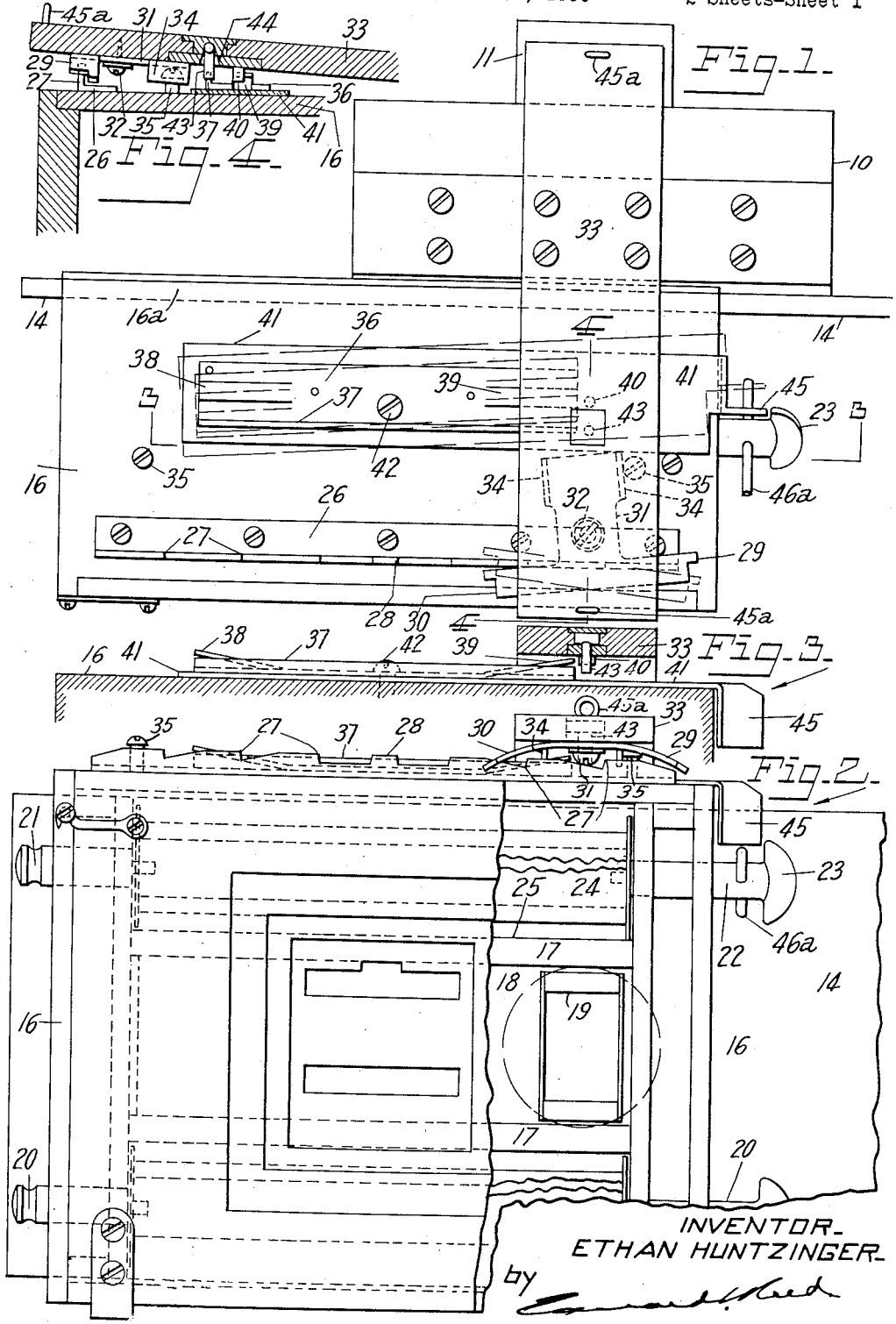
INVENTOR.
ETHAN HUNTZINGER.
by
his ATTORNEY.

Oct. 19, 1937.  E. HUNTZINGER  2,096,496
CAMERA
Filed Nov. 30, 1936  2 Sheets-Sheet 2
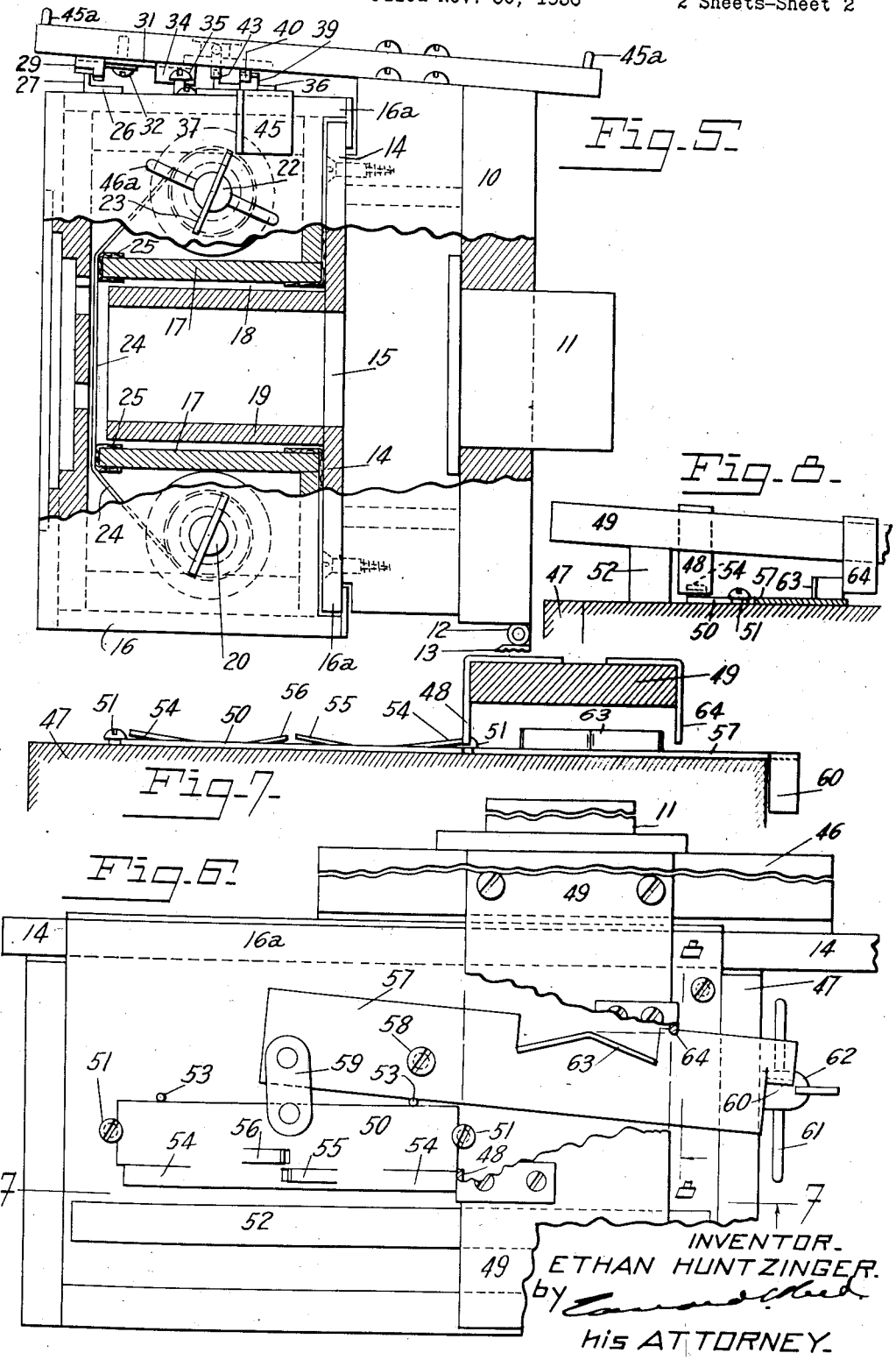

Patented Oct. 19, 1937

2,096,496

UNITED STATES PATENT OFFICE 2,096,496

CAMERA

Ethan Huntzinger, Piqua, Ohio

Application November 30, 1936, Serial No. 113,373

16 Claims. (Cl. 95—37)

This invention relates to a camera and more particularly to a camera adapted to make a series of exposures across a width of a film and commonly known as a multiplying camera. In such a camera the lens supporting structure and the film supporting structure are relatively movable so that one may be moved with relation to the other to bring the lens successively into line with different portions of the film. The movable structure is shifted step by step by hand, an exposure being made after each movement, and it sometimes happens that after stopping for an exposure the operator will forget in which direction he had been moving the movable structure or, due to confusion or otherwise, will move the camera in the wrong direction so as to bring the lens in line with an exposed portion of the film which, of course, results in a double exposure. It also happens that after completing a series of exposures across the width of the film the operator will reverse the movement of the movable structure and start a second series of exposures without advancing the film, thus again resulting in double exposure. Such a camera is usually provided with sights to enable the operator to accurately aline the lens with the person or object being photographed. Ordinarily one sight is mounted on the lens support and the other sight is mounted on the film support, one or the other of the sights being provided with a plurality of sight openings, but with this arrangement the sight openings of the two sights are frequently out of line and difficulty is experienced in correctly positioning the lens with relation to the object to be photographed.

One object of the invention is to provide such a camera with means for preventing the reverse movement of the movable support until it has completed its movement in the direction in which it has started.

A further object of the invention is to provide means for automatically locking the movable support against reverse movement, after it has reached the limit of its movement in one direction, until the locking means has been released; and, further, to provide means controlled by the device which advances the film to release the locking means, thus preventing the movable support from being reversed until the film has been advanced or the locking means has been manually released, and the necessity for manually releasing the locking means would then call the attention of the operator to the fact that he had not advanced the film.

A further object of the invention is to provide such a camera with a sight supporting member or bar carried by the lens support and so arranged that both sights may be mounted thereon in proper relation one to the other and thus will at all times be in proper alinement.

Other objects of the invention may appear as the apparatus is described in detail.

In the accompanying drawings Fig. 1 is a top plan view of a camera embodying my invention; Fig. 2 is a rear elevation of the same, partly broken away; Fig. 3 is a section taken on the line 3—3 of Fig. 1; Fig. 4 is a section taken on the line 4—4 of Fig. 1; Fig. 5 is a side elevation of a camera, partly in section; Fig. 6 is a top plan view of a similar camera, partly broken away, and showing a modified form of controlling mechanism; Fig. 7 is a section taken on the line 7—7 of Fig. 6; and Fig. 8 is a sectional detail view taken on the line 8—8 of Fig. 6.

In these drawings I have illustrated the present invention as applied to a multiplying camera of a known construction and, as here illustrated, the camera comprises a front portion 10 which supports the lens 11 and which, in the present instance, is the stationary part of the camera, it being shown in Fig. 5 as hinged at 12 on the supporting structure 13 which may be a part of or secured to a tripod. Secured to the lens support and forming a part thereof is a back plate 14 which extends beyond both sides of the main portion of the lens support and is provided with an opening 15 in line with the lens. The rear portion of the camera, which constitutes the film support 16, is box-like in form and is in the present instance slidably mounted on the lens support, it being provided with guideways 16a to receive the upper and lower edges of the back plate 14 and thus slidably support the film box thereon. Mounted within the box-like film support are two horizontal partitions 17 which are spaced one from the other and the space between these partitions registers with an elongate horizontal opening 18 in the back plate 14. A housing 19 is secured to the back plate in line with the opening 15 therein and projects into the space between the partitions 17 and serves to confine the light from the lens to the desired portion of the film and thus "frame" the exposure. The film support is provided with roll supporting members or shafts 20 arranged below the lower partition 17 and adapted to support the roll of film, and is also provided above the upper partition 17 with roll supporting members or shafts 21 and 22 adapted to support the roll on which the film is rewound. The shaft 22 is provided with a head or thumb piece 23 by means of which it may be rotated and thus constitutes the rewinding member for the film. The film 24 passes from the lower roller about the edges of the horizontal partitions 17 to the upper roller, the edges of the partitions being provided with protective coverings 25 to prevent the scratching of the film. In using such a camera the film support is moved to the limit of its movement in one direction and in this position the lens and light housing are properly located with relation to the film for the first exposure. After this exposure is made the film support is moved one step to properly aline the lens and light housing with a succeeding portion of the film and another exposure is made, this operation being repeated until the full number of exposures have been made, which, in the present instance, is six. When one series of exposures has been completed the film is advanced to bring a further portion thereof in line with the light housing and the film support is then moved step by step in the opposite direction and a second series of exposures made.

In order to prevent the inadvertent reversing of the movable support, which in the present instance is the film support, after it has been started in one direction, I have provided the film support with a series of stops arranged substantially in a line parallel with the line of movement of the film support. Cooperating with these stops are two detents or pawls which are carried by the lens support and are so mounted that either one but not both of the detents may move into operative relation to the stops, the stops being so arranged that the operative detent will engage one of the stops after each step of movement of the film support and will thus prevent the reverse movement of the film support. In the particular construction illustrated in Figs. 1 to 5 I have secured to the top of the film support a stop plate 26 having an upturned flange on which are formed a plurality of teeth 27, the teeth at the respective ends of the flange both facing inwardly, so that the teeth at one end serve to cooperate with one of the detents to prevent the movement of the film support in one direction and the teeth at the other end of the bar cooperate with the other detent to prevent the movement of the film support in the opposite direction. An intermediate tooth 28 cooperates with both detents. The two detents are preferably mounted for movement about a common axis and, as here shown, they comprise resilient fingers 29 and 30 and are formed integral with a plate 31 which is pivotally supported between its ends, at 32, on an overhanging member carried by the lens support, this overhanging member being in the present instance in the form of an elongate member or bar 33 which is rigidly secured to the lens support 10 and extends rearwardly above the film support to a point adjacent the rear side of the latter. The detents 29 and 30 are so arrranged with relation to the pivotal axis of the plate 31 that the movement of the plate in one direction about its axis will move the detent 29 into operative relation to the stops, as shown in Fig. 1, and the movement of the plate in the other direction will move the detent 29 to an inoperative position and will move the detent 30 into operative relation to the detent stops. This movement is preferably imparted to the plate automatically as the film support approaches either limit of its movement. In the present arrangement the plate 31 is provided in front of its axis with downwardly extending lips 34 which are arranged to engage one or the other of two studs 35, mounted on the film support, as the latter approaches the limit of its movement in either direction so that the continued movement of the film support to the limit of its movement will actuate the plate to reverse the positions of the two detents. As shown in Figs. 1 and 2 the film support has been moved to the left to the limit of its movement. Inasmuch as the support is automatically locked in this position, as will be hereinafter described, it is unnecessary to provide a stop for cooperation with the pawl 29 in this position. The first movement of the film support, that is, to a position for the second exposure, will cause the detent 29 to ride over the first stop 27 and spring into engagement with the inner face of the stop and the successive movements of the film support will cause the detent to ride over the successive teeth or stops and at the end of each movement the support is locked against reverse movement. As the film support moves to its last position the stud 35 at the left hand end of the film support will engage the plate 31 and move the same about its pivotal axis to reverse the positions of the detents, thus bringing the detent 30 into operative relation to the teeth or stops at the left hand end of the film support. The stops or teeth 27 also serve to accurately locate the light housing 19 with relation to the film and thus provide a proper spacing between exposures. After the detent has sprung into the recess in front of a tooth a slight rearward pressure on the film support will cause the detent to positively engage the face of the tooth and thus correctly position the housing.

For the purpose of making certain that the film will be advanced before the film support is moved in a reverse direction after having completed its movement in one direction, I have provided means for automatically locking the film support against reverse movement at each limit of its movement and for this purpose I have mounted on the top of the film support a movable plate 36 having at one edge thereof an upright flange 37 and provided near its ends with two yieldable detents 38 and 39 which are arranged to cooperate with a stop carried by the lens support, such as a stud 40 depending from the cross bar 33. The detents 38 and 39 may be moved into and out of operative relation to the stop 40 in any suitable manner. In the present instance the plate 36 is rigidly secured to an elongate plate 41 which is pivotally mounted between its ends on the film support, as shown at 42. The two detents are so arranged that when the plate 41 is in a position substantially parallel with the line of movement of the film support the detent at that end of the plate 36 adjacent the stop 40 will be in line with and close to that stop so that the film support is locked against movement, and when the plate 41 is moved about its axis the detent will be moved out of line with the stop to permit of the movement of the film support. Therefore, when the film support begins its movement in either direction the flange 37 of the detent supporting plate 36 will be in a slightly oblique position, as shown in dotted lines in Fig. 1. A second stop or stud 43, also depending from the cross bar 33, is arranged to engage the oblique flange 37 as the film support moves forwardly and to thus move the plates 36 and 41 into their straight line positions parallel with the line of movement. This brings the detent at the rear end of the plate 36 into line with the stop 40 and the detent will yield to permit it to pass beneath the stop and will then spring upward into locking position with relation to the stop. The flange 37 is moved to the same position upon each releasing of the film support and it is therefore necessary that the stud 43 should be capable of engaging first one side of the flange and then the other side thereof so that the detent plate 36 will be moved in the same direction regardless of the direction of movement of the film support. For this purpose the stud 43 is pivotally mounted for a slight movement transverse to the flange 37, as shown at 44.

The detent may be moved to an inoperative position in any suitable manner but, in the present instance, the plate 41 which carries the detent plate 36 extends beyond the side of the film support and is provided with a downturned end or lip 45 arranged in the path of a pin 46a mounted in the rewinding member or shaft 22 so that the rotation of the rewinding member while the detent is in locking position will cause the pin 46a to engage the lip 45 and move the plate 41 about its axis, thereby moving the detent to its inoperative position. The plate 41 may, of course, be moved by hand to release the film support for reverse movement but the mere fact that the film support is locked and must be released calls the operator's attention to the fact that the film has not been advanced. As shown in the drawings the film support is in its left hand position and the detent 39 is in operative relation to the stop 40. When the film support has been moved to its right hand position the detent 38 will lie on the right hand side of the stop 30 in operative relation thereto.

It will be understood that while I have shown and described the film support as movable with relation to a stationary lens support, this may be reversed and the film support may be stationary and the lens support movable with relation thereto without in any way affecting the operation of the devices above described.

The cross bar 33 which is carried by the lens support and extends to the rear of the film support has mounted near its respective ends apertured members 45a arranged in line one with the other and constituting sights by means of which the lens may be accurately positioned with relation to the object to be photographed. Both sight members being rigidly connected with the lens support will at all times be in proper relation one to the other and to the lens.

In Figs. 6, 7, and 8, I have shown a slightly modified form of the controlling mechanism. As there shown, the lens support 46 and the film support 47 are of substantially the same construction and arrangement as that above described but in this case I prefer that the film support should be stationary and the lens support should be movable with relation thereto. In this form of the mechanism the device for requiring the completion of the movement of the movable support in one direction before it can be reversed comprises a stop 48 carried by the transverse bar 49. Cooperating with the stop 48 is a stop plate 50 which is mounted on the film support for bodily transverse movement, the ends of the plate moving in guideways formed beneath screw heads 51. The rearward movement of the plate 50 is limited by a flange 52 on the film support and its forward movement is limited by pins 53. Adjacent to each end thereof the plate is provided with a resilient detent 54, such as a spring finger cut from the metal of the plate, said detents extending in opposite directions. A yieldable detent 55 is arranged between and in line with the detents 54 and faces toward the left in Fig. 6, and a yieldable detent 56 is arranged adjacent to the detent 55 but out of line therewith and faces in the opposite direction. When the plate 50 is in its foremost position, in contact with the pins 53, the detents 54 are in line with the stop 48 and the right hand detent 54 is in operative relation to that stop, and before the lens support can be moved to the left with relation to the film support the plate 50 must be moved to its rearmost position to release the stop 48. The plate is preferably moved to its rearmost position by manually operated means and is then moved to its operative position by automatic means controlled by the movement of the lens support. In the construction shown an elongate plate 57 is pivotally mounted between its ends on the film support, as shown at 58, and has one end connected by a link 59 with the plate 50. The plate 57 extends beyond the side of the film support and is provided with a downturned lip 60 arranged to be engaged by a pin 61 on the film rewinding member 62 in the manner above described, thus moving the plate 57 about its axis and shifting the detent plate 50 rearwardly and permitting the movement of the lens support to the left. The plate 57 is provided with an angular flange 63, in the form of a wide V, which, when the plate 57 has been moved to its foremost position to release the lens support, will lie in the path of a stop or trip member 64 rigidly secured to and depending from the cross bar 49 and this trip member 64 moving along the inclined surface of the flange 63 will actuate the plate 57 to move the detent plate 50 forwardly into its operative position. This movement takes place before the lens support has completed its movement and during the final movement thereof the stop 48 will ride over the left hand detent 54 which will then spring upwardly into the path of the stop to lock the lens support against reverse movement until the locking mechanism has been released, and upon the movement of the lens support in the other direction, to the right in Fig. 6, the trip member 64 will again act on the angular flange 63 to restore the plate to its operative position. It will be noted that the angular flange 63 of the plate 57 is near the right hand side of the film support and therefore acts upon the plates to move the detents 54 into line with the stop 48 during the first portion of the movement of the lens support to the left, thus the intermediate detent 55 is moved into the path of the stop 48, the latter will ride over the detent which will then spring into the path of the stop to prevent the reverse movement of the lens support. The camera shown in Figs. 6 to 8 is adapted to make but three exposures across the width of the film and therefore one intermediate stop 55 is sufficient to cause the lens support to complete its movement in one direction before it is reversed. However, when the lens support is moved to the right the trip finger 64 will not engage the flange 63 until the lens support is near the limit of its movement. Consequently the detent 56 is spaced forwardly from the detent 55 so that when the plate 50 is in its rearmost or inoperative position the detent 56 will lie in the path of the stop 48 and will function to prevent the reverse movement of the lens support.

While I have shown and described certain embodiments of my invention I wish it to be understood that I do not desire to be limited to the details thereof as various modifications may occur to one skilled in the art.

Having now fully described my invention, what I claim as new and desire to secure by Letters Patent, is:

1. In a camera comprising a lens support and a film support, one of said supports being movable with relation to the other support to cause the lens to be alined with different parts of the film, a member carried by one of said supports and having a single row of stops arranged substantially in a line parallel with the line of movement of said movable support, a part of said stops facing in one direction and another part of said stops facing in the other direction, and a second member carried by the other support and adapted to cooperate with said stops to prevent the reverse movement of said movable support until the latter has completed its movement in the direction in which it has started, one of said members being movable transversely to the line of movement of said movable support, and said stops being so arranged that when said movable member is in one position said second member will cooperate with a stop which faces in one direction and when said movable member is in another position said second member will cooperate with a stop which faces in the other direction.

2. In a camera comprising a lens support and a film support, one of said supports being movable with relation to the other support to cause the lens to be alined with different parts of the film, a member carried by one of said supports and having a single row of stops arranged substantially in a line parallel with the line of movement of said movable support, a part of said stops facing in one direction and another part of said stops facing in the other direction, and a second member carried by the other support and adapted to cooperate with said stops to prevent the reverse movement of said movable support until the latter has completed its movement in the direction in which it has started, one of said members being movable transversely to the line of movement of said movable support, and said stops being so arranged that when said movable member is in one position said second member will cooperate with a stop which faces in one direction and when said movable member is in another position said second member will cooperate with a stop which faces in the other direction, and means actuated by the movement of said movable support with relation to the other support to impart transverse movement to said movable member.

3. In a camera comprising a lens support and a film support, one of said supports being movable with relation to the other support to cause the lens to be alined with different parts of the film, a member carried by said film support and having a plurality of stops arranged substantially in a line parallel with the line of movement of said movable support, a second member carried by said lens support and adapted to cooperate with said stops to prevent the reverse movement of said movable support until the latter has completed its movement in the direction in which it has started, one of said members being movable transversely to the line of movement of said movable support to permit the reverse movement of said movable support after it has completed its movement in the direction in which it started, a part movably mounted on one of said supports and connected with said movable member, and a part fixed with relation to the other support and arranged to engage the first mentioned part and actuate said movable member.

4. In a camera comprising a lens support and a film support, one of said supports being movable with relation to the other support to cause the lens to be alined with different parts of the film, a member carried by said film support and having a plurality of stops arranged substantially in a line parallel with the line of movement of said movable support, a second member carried by said lens support and adapted to cooperate with said stops to prevent the reverse movement of said movable support until the latter has completed its movement in the direction in which it has started, one of said members being movable transversely to the line of movement of said movable support to permit the reverse movement of said movable support after it has completed its movement in the direction in which it started, said stops being arranged to accurately locate the lens in successive positions with relation to said film.

5. In a camera comprising a lens support and a film support, one of said supports being movable with relation to the other support to cause the lens to be alined with different parts of the film, a single row of stops carried by said film support and arranged substantially in a line parallel with the line of movement of said movable support, a part of said stops facing in one direction and another part of said stops facing in the opposite direction, two detents carried by said lens support and movable alternately into and out of operative relation to the respective stops, and means controlled by the movement of said movable support for actuating said detents to move one detent into operative relation to the stops which face in one direction and to move the other detent out of operative relation to the stops which face in the opposite direction, said stops being arranged to accurately locate the lens in successive positions with relation to said film.

6. In a camera comprising a lens support and a film support, one of said supports being movable with relation to the other support to cause the lens to be alined with different parts of the film, two groups of stops carried by said film support, the stops of each group being arranged substantially in a line parallel with the line of movement of said movable support, and the stops of the respective groups facing in opposite directions, a member movably mounted on said lens support, two detents carried by said member and movable thereby into and out of operative relation to the respective groups of stops, and parts carried by said film support and so arranged that one or the other of said parts will act on said movable member as said movable support approaches the limit of its movement in either direction to cause said member to move one detent out of operative relation to its group of stops and to move the other detent into operative relation to its group of stops.

7. In a camera comprising a lens support and a film support, one of said supports being movable with relation to the other support to cause the lens to be alined with different parts of the film, a plurality of stops carried by said film support and arranged substantially in a line parallel with the line of movement of said movable support, two detents carried by said lens support and movable into and out of operative relation to said stops, means for actuating said detents to move one detent into operative relation to said stops and to move the other detent out of operative relation with said stops, a stop carried by one of said supports, two detents carried by the other support, and means controlled by the movement of said movable support to move one of the last mentioned detents into line with the last mentioned stop when said movable support is moved to the limit of its movement in one direction and to move the other last mentioned detent into line with said last mentioned stop when said movable support is moved to the limit of its movement in the other direction.

8. In a camera comprising a lens support and a film support, one of said supports being movable with relation to the other support to cause the lens to be alined with different parts of the film, means for locking said movable support at the limit of its movement in one direction and including a stop carried by one of said supports, a detent mounted on the other of said supports for movement into and out of operative relation to said stop, means controlled by said movable support to move said detent into operative relation with said stop, and other means to move said detent to an inoperative position and thereby release said movable support for reverse movement.

9. In a camera comprising a lens support and a film support, one of said supports being movable with relation to the other support to cause the lens to be alined with different parts of the film, means for locking said movable support at the limit of its movement in one direction and including a stop carried by one of said supports, a detent mounted on the other of said supports for movement into and out of operative relation to said stop, means controlled by said movable support to move said detent into operative relation to said stop, a film rewinding member carried by said film support, and means actuated by said rewinding member to move said detent to an inoperative position.

10. In a camera comprising a lens support and a film support, one of said supports being movable with relation to the other support to cause the lens to be alined with different parts of the film, means for locking said movable support at the limit of its movement in either direction and including a stop carried by said lens support, two detents carried by said film support, a member movably mounted on said film support and operatively connected with said detents, and a part carried by said lens support and acting on said member to move one detent into operative relation to said stop when said movable member is moved in one direction and to move the other detent into operative relation with said stop when said movable support is moved in the other direction, each detent being movable to its inoperative position independently of said part.

11. In a camera comprising a lens support and a film support, one of said supports being movable with relation to the other support to cause the lens to be alined with different parts of the film, means for locking said movable support at the limit of its movement in either direction and including a stop carried by said lens support, two detents carried by said film support, a member movably mounted on said film support and operatively connected with said detents, and a part carried by said lens support and acting on said member to move one detent into operative relation to said stop when said movable member is moved in one direction and to move the other detent into operative relation with said stop when said movable support is moved in the other direction, a film rewinding member carried by said film support, and means controlled by said rewinding member and acting on said movable member to move that detent which is in operative position to an inoperative position.

12. In a camera comprising a lens support and a film support, one of said supports being movable with relation to the other support to cause the lens to be alined with different parts of the film, a stop carried by said lens support, an elongate member pivotally mounted on said film support and having a flange, detents carried by said member on the respective sides of its pivotal axis and movable thereby into and out of operative relation to said stop, and a part carried by said lens support and acting on said flange to move said member about its axis when movement is imparted to said movable support.

13. In a camera comprising a lens support and a film support, one of said supports being movable with relation to the other support to cause the lens to be alined with different parts of the film, a stop carried by said lens support, an elongate member pivotally mounted on said film support and having a flange, detents carried by said member on the respective sides of its pivotal axis and movable thereby into and out of operative relation to said stop, and a stud carried by said lens support and acting on said flange to move said member about its axis when movement is imparted to said movable support, said stud having limited movement transversely to said flange to enable it to engage either side of said flange.

14. In a camera comprising a lens support and a film support, one of said supports being movable with relation to the other support to cause the lens to be alined with different parts of the film, a stop carried by said lens support, an elongate member mounted on said film support for transverse movement with relation thereto, oppositely acting detents carried by said member near the ends thereof and so arranged that when said member is in one position both detents will be in line with said stop, a second member pivotally mounted on said film support and operatively connected with the first mentioned member, and means carried by said lens support to act on said second member and cause the same to impart movement to said first mentioned member when said movable support is actuated.

15. In a camera comprising a lens support and a film support, one of said supports being movable with relation to the other support to cause the lens to be alined with different parts of the film, a stop carried by said lens support, an elongate member mounted on said film support for transverse movement with relation thereto, oppositely acting detents carried by said member near the ends thereof and so arranged that when said member is in one position both detents will be in line with said stop, a second member pivotally mounted on said film support and operatively connected with the first mentioned member, and means carried by said lens support and controlled by the movement of said movable support to move said second member about its pivotal axis during the first portion of the movement of said movable support in one direction and during the final portion of the movement of said movable support in the other direction.

16. In a camera comprising a lens support and a film support, one of said supports being movable with relation to the other support to cause the lens to be alined with different parts of the film, a member rigidly secured to said lens support and extending rearwardly above said film support, and cooperating sight members secured to said member near the front and rear ends thereof.

ETHAN HUNTZINGER.